2 Sheets—Sheet 1.
A. CROSBY.
POWER STEERING APPARATUS.
No. 188,859. Patented March 27, 1877.
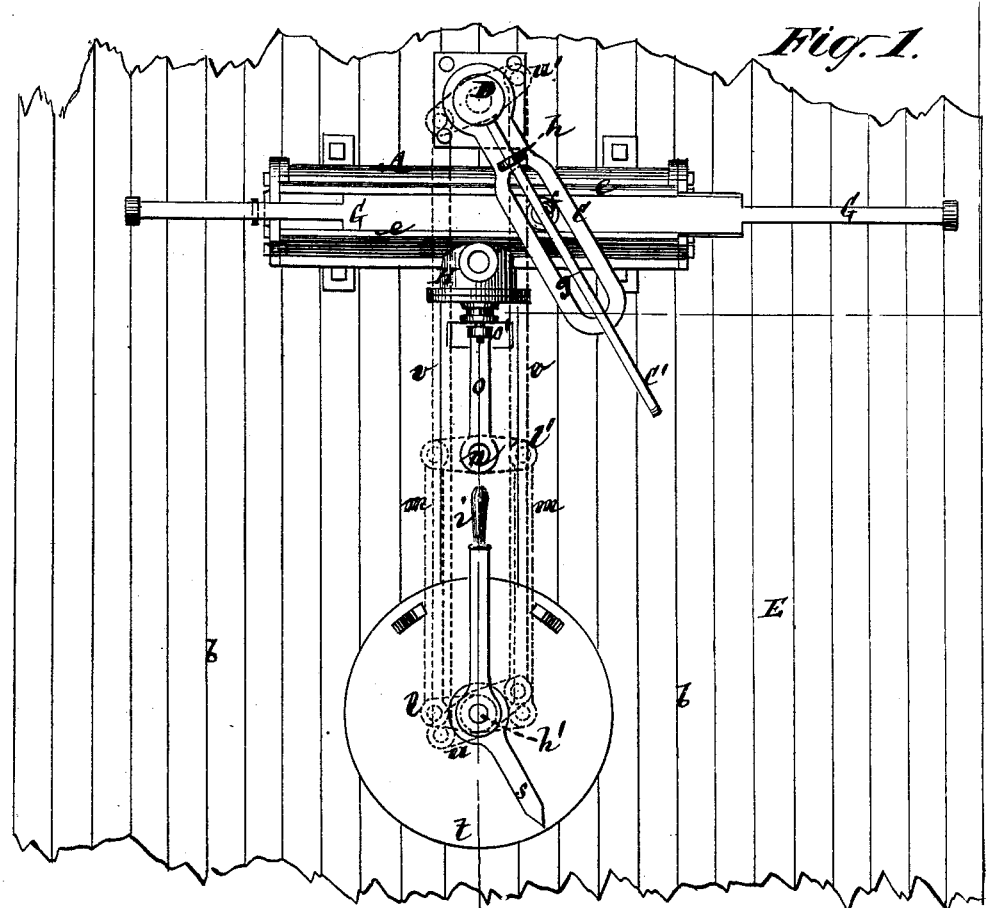
Fig. 1.
Fig. 2.
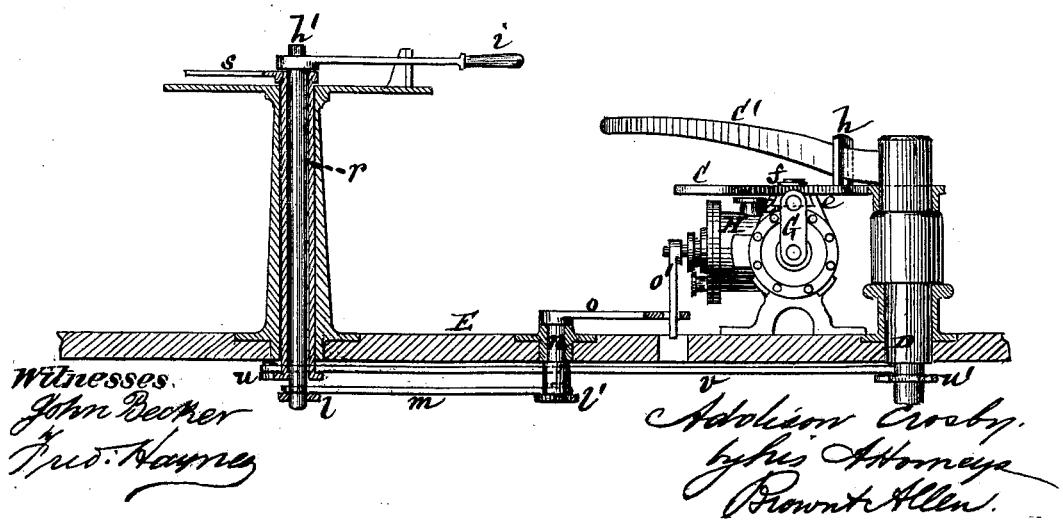
Witnesses
John Becker
Fred. Haynes
Addison Crosby.
by his Attorneys
Brown & Allen.

A. CROSBY.
POWER STEERING APPARATUS.

No. 188,859. Patented March 27, 1877.

UNITED STATES PATENT OFFICE.

ADDISON CROSBY, OF NEW YORK, N. Y., ASSIGNOR TO CENTRAL PROPELLING COMPANY, OF SAME PLACE.

IMPROVEMENT IN POWER STEERING APPARATUS.

Specification forming part of Letters Patent No. 188,859, dated March 27, 1877; application filed December 27, 1876.

*To all whom it may concern:*

Be it known that I, ADDISON CROSBY, of the city, county, and State of New York, have invented certain new and useful Improvements in Power Steering Apparatus; and I do hereby declare that the following is a full, clear, and exact description of the same, reference being had to the accompanying drawing, which forms part of this specification.

This invention relates to certain improvements in power steering apparatus; and consists in a novel combination of parts, which will be fully hereinafter described, the essential features of the invention consisting in the combination, with the operating cylinder and piston, and the tiller of a power steering apparatus connected with said piston, of a valve constructed to admit steam or other fluid into the cylinder upon both sides of the piston simultaneously, whereby the piston and the tiller are held in a locked position, as will more fully hereinafter appear.

Figure 3:
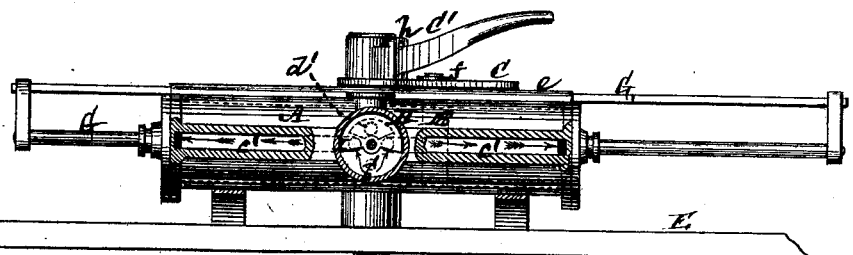
Figure 4:
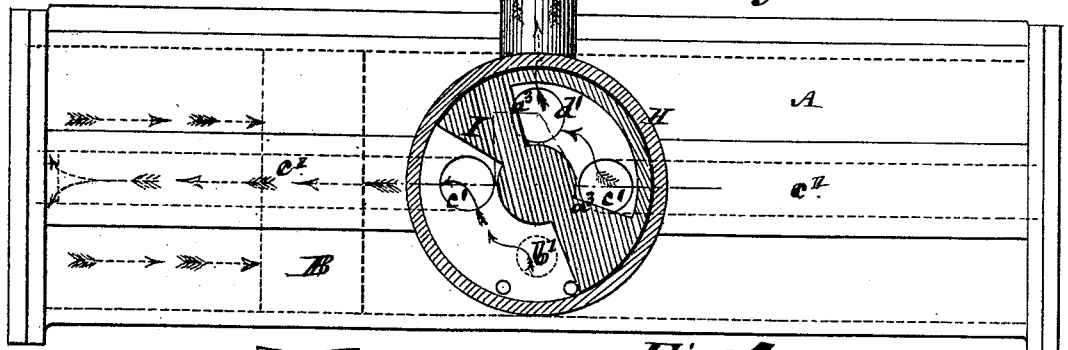
Figure 5:
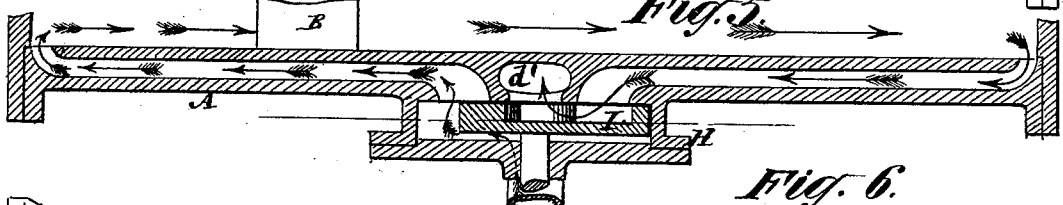

Figure 1 represents a plan of a power steering apparatus constructed in accordance with my invention; and Fig. 2, a partially-sectional side view of the same in direction of the length of the vessel. Fig. 3 is a partly-broken longitudinal view of the working-cylinder, with the yoke-connection by which the operating-piston is made to actuate the tiller. Figs. 4, 5, 6, and 7 are longitudinal views, upon an enlarged scale, and mainly in section, of the working-cylinder, with its piston, its valve, and the ports or passages by which the piston is controlled under different positions of the valve, Figs. 4 and 5 being in planes at right angles with each other, and Figs. 6 and 7 being like views, but with the valve in a different position.

A is the working-cylinder, placed athwart the ship, or arranged in transverse relation with the line of the central position of the tiller C, and containing a piston, B, which has a direct connection with the tiller.

E represents the ship's deck, the plank-joints *b* of which are in direction of the length of the vessel.

The tiller C, which is operated by the power apparatus, is fitted loose on the rudder-post D, but is connected with the latter, when required, by a hand-tiller, C′, fast to said post, and a removable coupling pin or piece, *h*, uniting the tillers C and C′ together. This combination of parts affords a ready means for working rudder, either by power or by hand, the removal of the coupling pin or piece *h* disconnecting the power apparatus from action on the rudder.

The piston B in the cylinder A is connected with the tiller C by means of a yoke, G, arranged to pass through both ends of the cylinder A, and fitted to work within or between longitudinal guides *e e* on the cylinder.

In such combination of the piston B with the tiller C the direct connection between said devices is such that the piston B is made to operate with a wedge-like action on the tiller C, and with a gradually-increasing acuteness of angle, and at a longer leverage, as the rudder is shifted to either side of its central position, thereby largely augmenting the power of the steering apparatus on the rudder as the resistance of the water on the latter is increased by the shifting of it larboard or starboard. Thus that portion of the yoke G which slides between the guides *e e* is provided with a roller, *f*, that fits within a slot, *g*, in the tiller C; or, instead of such rolling connection of the yoke G with the tiller C, a sliding one operating in like manner may be used.

The piston B, which operates and controls the tiller C, is governed by a valve which may be under control of the man in charge in the pilot-house by means of an upright spindle, *h′*, provided with a hand wheel or lever, *i*. This spindle *h′* carries at its foot a cross-bar, *l*, which is connected, by rods, ropes, or chains *m m*, with a corresponding cross-bar, *l′*, on the spindle *n* of which is a crank, *o*, that serves to give motion to the valve. The spindle *h′* is arranged concentrically within a rotating sleeve, *r*, on the upper end of which is an index, *s*, arranged to move over a dial, *t*, and serving to indicate the position of the rudder, said sleeve having fast on its lower end a cross beam or bar, *u*, which is connected, by ropes, chains, or rods *v*, with a corresponding cross beam or bar, *u′*, on the rudder-post. By these means the same index, operating from the same center of motion as the valve-controlling lever $i$, serves to indicate to the pilot the position of the rudder, both when the latter is being worked by the power steering apparatus through the tiller C and when it is worked by the hand-tiller C'.

The valve I, which controls the piston B, and works within a valve box or case, H, is here shown as a rolling one; but it may be constructed to have any desired line of motion, straight or otherwise, without changing its principle of action as regards control of the piston. Thus, the steam, supposing such to be the actuating medium, (although water under pressure or any other actuating medium may be used instead, if desired,) is introduced by an inlet, $b'$, to the valve box or case, and from thence is passed by either duct or passage, $c'$, leading to opposite ends of the cylinder A, according to the direction in which it is required to move the piston B, and according to the adjustment of the valve I, the other of said passages $c'$ being opened to the main or general exhaust-port $d'$. Such is the disposition of the valve in relation with the ports or passages which it controls (shown in Figs. 4 and 5) when the piston B is moving to the right, the valve H being adjusted to the necessary position by the connection of the crank $o$ of the spindle $n$ with a crank, $o'$, on the valve-spindle.

A reverse action of the valve produces a reverse movement of the piston B.

Figure 6:
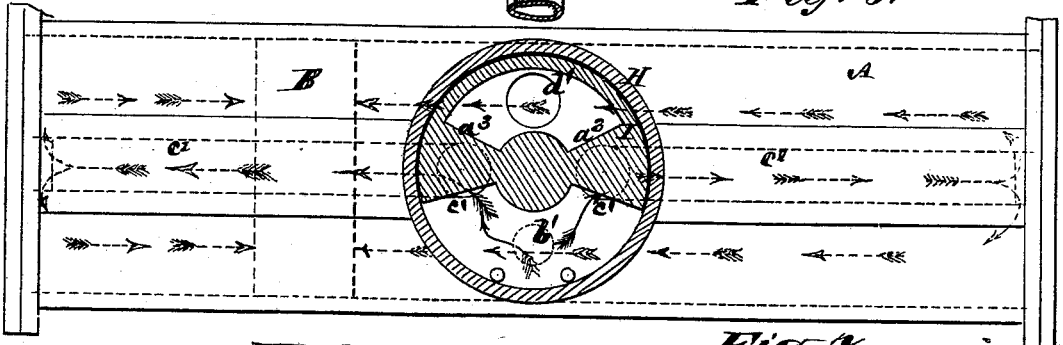
Figure 7:
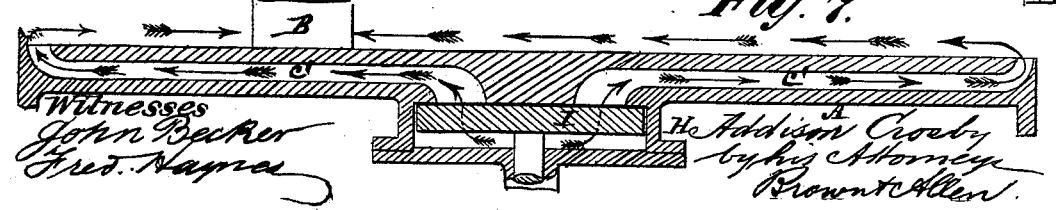

When, however, it is required to hold the piston B, tiller C, and rudder at any position to which they may have been adjusted, or, in other words, to arrest the motion of the piston at different points in its stroke, to hold the rudder, but not in an inflexible manner, so as to produce breakage of the parts, in any position to which it may have been moved, the valve I is adjusted to the position represented for it in Figs. 6 and 7, so as to close the exhaust-port $d'$ to both ends of the cylinder A, while steam is simultaneously admitted to opposite sides of the piston by the ducts $c'$, thereby producing a counteracting pressure of the steam or actuating medium on the piston. This is effected by constructing the valve with lap on the exhaust side $a^3 a^3$ of its face or faces which control the ports, to close communication with the exhaust-port $d'$, while the opposite side of said face or faces leave the ducts $c'$ partly open, as clearly shown in Fig. 6 of the drawing.

I claim—

1. The combination, with the rudder, the tiller C, and the yoke G, connected with the tiller, as described, of the guides $e\ e$ on the cylinder A, for guiding said yoke, substantially as shown and described.

2. The combination, in a steering apparatus constructed to provide either for steering by hand or by power, of an index, $s$, on the sleeve $r$, operated by the motion of the rudder and the spindle $h'$, by which the valve is controlled, fitted with a hand wheel or lever, and arranged concentrically within the sleeve $r$, essentially as described.

3. The tiller C, loosely fitted on the rudder-post D, in combination with the hand-tiller C', fast to said post, and a removable coupling pin or piece, $h$, applied to said tillers, essentially as and for the purpose herein set forth.

4. The combination, with the operating-cylinder, piston, and the tiller of a power steering apparatus connected with said piston, of a valve constructed to admit steam or other fluid into the cylinder upon both sides of the piston simultaneously, substantially as described, whereby said piston and the tiller are held in a locked position, as and for the purpose set forth.

ADDISON CROSBY.

Witnesses:
HENRY T. BROWN,
BENJAMIN W. HOFFMAN.